United States Patent

Gaumont

[15] 3,690,482
[45] Sept. 12, 1972

[54] VEHICLE TOWING DEVICE

[72] Inventor: Richard J. Gaumont, 7906 Bleroit Ave., Los Angeles, Calif. 90045

[22] Filed: July 12, 1971

[21] Appl. No.: 161,668

[52] U.S. Cl. .............................. 214/86 A, 280/402
[51] Int. Cl. ............................................. B60p 3/12
[58] Field of Search ..................... 214/86 A; 280/402

[56] References Cited

UNITED STATES PATENTS 2,782,944   2/1957   Macklin ................... 214/86 A
3,570,690   3/1971   Wegener et al. .......... 214/86 A

*Primary Examiner*—Albert J. Makay
*Attorney*—Sokolski & Wohlgemuth

[57] ABSTRACT

A vehicle towing device of the cradle type has a pair of cradle arms which are connected to a tow truck through a support member which may comprise a plate. One of the ends of each of the arms is attached to the support member for pivotal motion about a substantially vertical axis. The support member is attached to the lower structure of a tow truck by means of a ball and socket joint which permits limited two degree motion. The ends of the cradle arms opposite to those attached to the support plate have trays attached thereto for retaining and supporting the wheels of the vehicle to be towed. The cradle arms are interconnected at points therealong intermediate the opposite ends thereof by means of an adjustable bridging cross member. Means are provided for adjusting the lengths of the arms and that of the bridging interconnecting member to adapt the device in the field for utilization with various size vehicles. The bridging interconnecting member has a bracket unit attached thereto, through which the tow chain or cable fits. In utilizing the device, one end of each of two tow cables or chains is secured to the axle or the frame of the vehicle to be towed, each of these chains or cables being fitted through the aforementioned bracket and thence attached to the tow truck lift mechanism. When the lift mechanism is operated, the vehicle is first drawn onto the wheel support trays where the wheels are appropriately retained. Further lifting action of the lift mechanism lifts the cradle arms off the ground carrying along with it the front wheels of the vehicle until they reach an appropriate towing position.

14 Claims, 6 Drawing Figures

INVENTOR.
RICHARD J. GAUMONT
BY
SOKOLSKI & WOHLGEMUTH
ATTORNEYS

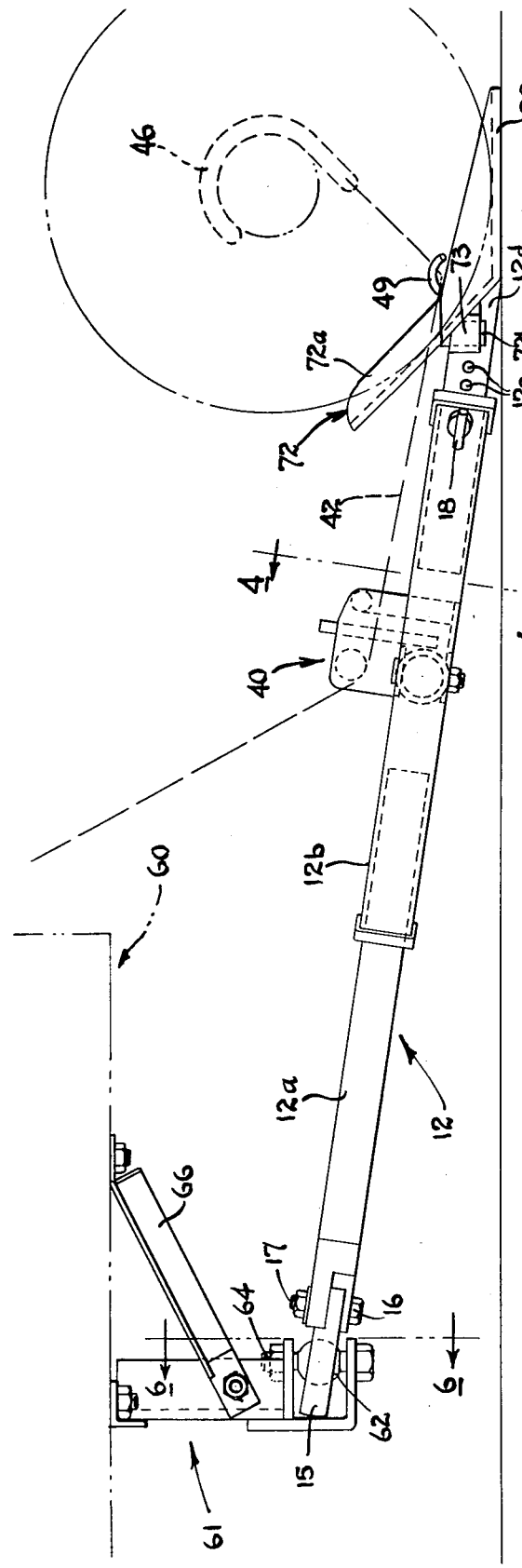
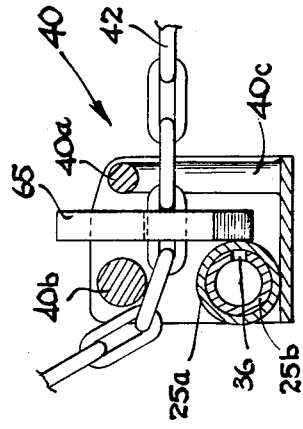
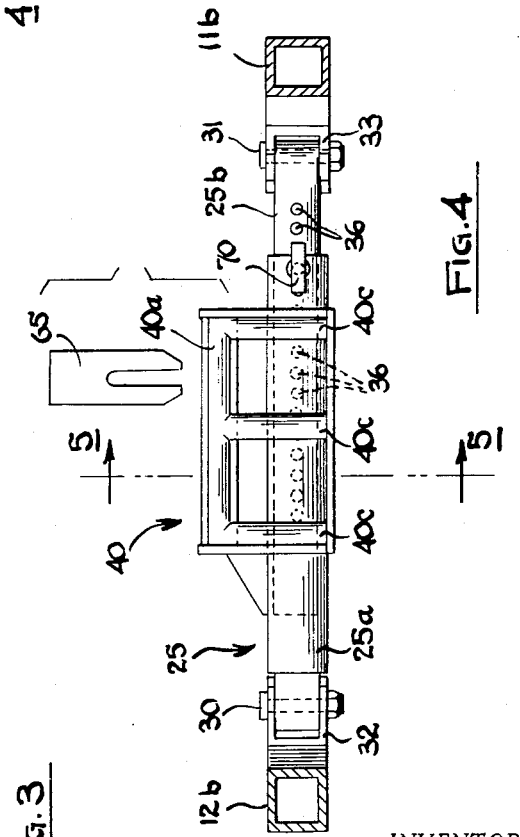

VEHICLE TOWING DEVICE

This invention relates to automobile towing devices, and more particularly to a cradle type unit for bringing to and retaining the wheels of a vehicle in an appropriate position for towing with a tow truck.

In my U.S. Pat. No. 3,285,443, a cradle type unit is described for use in towing vehicles with a tow truck. As explained in this patent, this type of device is particularly useful in towing vehicles that have not sustained a significant amount of damage to their front ends and which do not have particularly rugged bumper and front fender structure, in that it avoids placing force on the front structure of the vehicle which might cause damage thereto. The cradle unit of this patent offers several distinct advantages over the prior art in facilitating the use of cradle devices. In this patent, a pair of cradle arms are utilized which are pivotally mounted on the rear of the tow truck. Pull means in the form of a tow chain are attached to the lift mechanism of the tow truck and when the pull means is drawn upwardly it draws the cradle arms upwardly along with it to lift the vehicle to be towed off the ground to a towing position. While the cradle mechanism of my aforementioned patent provides distinct advantages over the prior art, it has been found that the structure utilized therewith was somewhat more cumbersome and expensive than to be desired.

The device of the present invention utilizes the same basic lifting principles of my prior patent, but provides distinct improvements in both its operation and structural implementation thereover. First, the present device has a much simpler structure utilizing considerably less parts which are of considerably lighter weight. Thus, the device of the present invention has the advantage of greater economy of construction and is easier to handle in the field. Further, the device of the present invention has the advantage of greater facility of adaptation in the field by a few simple adjustments for use in towing any of a great variety of different sized vehicles. Further, the device of the invention can be readily disassembled for stowage and reassembled by a single operator in a minimum amount of time. A further advantage of the present invention is that it can be readily installed on a tow truck having an existing tow plate or tow sling without removing or modifying this existing tow sling.

It is therefore an object of this invention to provide an improved cradle type tow device.

It is another object of this invention to provide a tow device which can be readily adapted in the field to handle a wide variety of different sized vehicles.

It is still another object of this invention to provide a cradle type tow unit of more simple and economical construction than prior art units.

It is still a further object of this invention to minimize the time and skill required to cradle lift a vehicle in position for towing.

Other objects of this invention will become apparent as the description proceeds in connection with the accompanying drawings, of which:

FIG. 3 is a side elevation view of the embodiment of FIG. 1;

FIG. 4 is a cross-sectional view taken along the plane indicated by 4—4 in FIG. 3;

FIG. 5 is a cross-sectional view taken along the plane indicated by 5—5 in FIG. 4.

Figure 1:
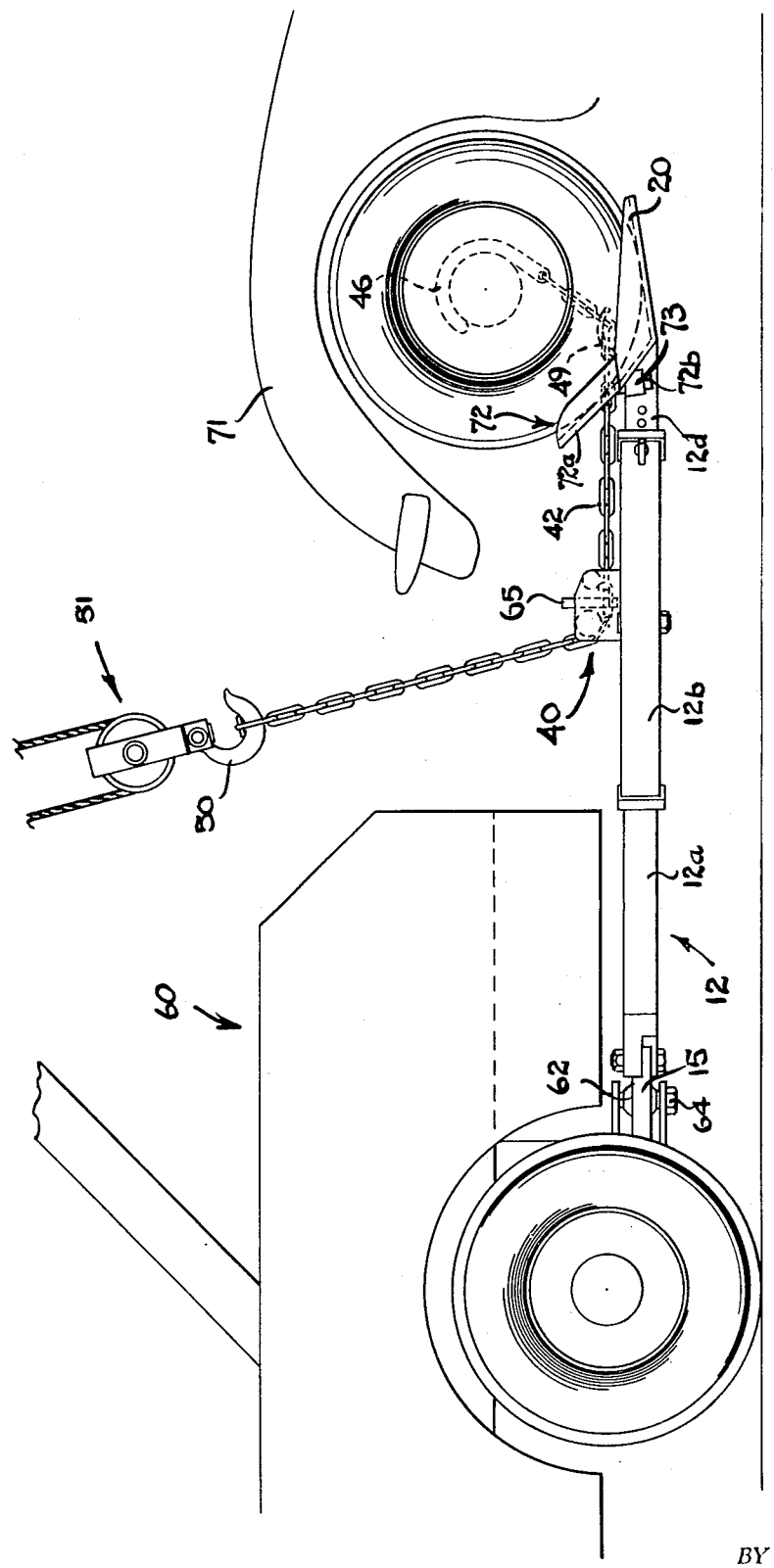
FIG. 1 is a side elevation view illustrating a preferred embodiment of the device of the invention being used to tow a vehicle.
Figure 6:
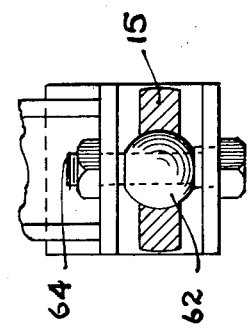
FIG. 6 is a cross-sectional view taken along the plane indicated by 6—6 in FIG. 3.

Briefly described, the device of the invention is as follows: A pair of cradle arms are each pivotally supported on support means, which may comprise a support plate, with fairly wide angles of horizontal motion about substantially vertical axes. The support plate is attached to a tow vehicle by joinder means which permits a limited amount of motion with two degrees of freedom ("pitch" and "roll"), this end result being achieved in the preferred embodiment by means of a ball and socket joint. The ends of each of the cradle arms opposite to that attached to the support plate each has a support tray attached thereto for supporting the wheels of the vehicle to be towed. The cradle arms are made telescopically so that their lengths can be adjusted individually to suit the particular application requirements at hand. The cradle arms are joined together at points therealong between the opposite ends thereof by means of a bridging cross member, the length of this cross member also being adjustable in length so that the spacing between the arms as well as their lengths can readily be adjusted in the field to adapt the device to the particular towing requirements at hand. Attached to the cross member is a bracket unit for receiving and retaining pull means in the form of tow cables or chains. As in typical towing operations, a pair of such cables or chains is utilized, these being attached at one end to the opposite sides of the front wheel axle or frame of the vehicle to be towed. The two chains are drawn through the bracket unit and then attached to the lift mechanism of the tow truck.

In utilizing the device, the lift mechanism is first operated to draw the vehicle so that the wheels are firmly seated in the cradle arm trays. Further operation of the lift mechanism will then draw the cradle arms upwardly, lifting the trays off the ground, thus likewise carrying the front end of the vehicle off the ground. When the desired towing position is reached, means are provided for retaining the chains in this position, the tow thus being properly held in place for towing.

Referring now to FIGS. 2–6, a preferred embodiment of the device of the invention is illustrated. Cradle arms 11 and 12 have first portions 11a and 12a which are pivotally supported on support plate 15 at opposite surfaces thereof by means of pivot pins 16 and 17 respectively. Arm portions 11a and 12a, which may be fabricated of rectangular tubing, are telescopically fitted into cradle arm portions 11b and 12b respectively. The cradle arms also include arm portions 11d and 12d which also telescopically fit within portions 11b and 12b respectively. The length of the arms may be adjusted by telescopic adjustment thereof to a desired position. A plurality of apertures 11c and 12c are provided in cradle arm portions 11a, 12a, 11d and 12d, these for receiving spring actuated latching pins 18, which retain the various arm portions together in any selected telescopic position. Fixedly attached to the ends of portions 11d and 12d of the cradle arms are wheel support trays 19 and 20 respectively, which receive the wheels of the vehicle to be towed.

Interconnecting cradle arms 11 and 12 is bridging cross arm member 25, which is formed of an outer telescoping member 25a which receives inner telescoping member 25b therein. The ends of members 25a and 25b are pivotally attached to cradle arms 12 and 11 respectively by means of pivot pins 30 and 31 which are supported in brackets 32 and 33, which in turn are fixedly attached to cradle arms 12 and 11 respectively. The length of cross arm 25 can be adjusted to a desired length and held in this desired position by means of spring actuated latching pin 70 which can be fitted into any one of a plurality of apertures 36 formed in arm member 25b. Thus, the length of cross arm 25 can be adjusted as desired and retained in the selected position.

Fixedly attached to arm member 25a is bracket unit 40 which is used for guiding and retaining the tow cables or chains 41 and 42. Chains 41 and 42 have hook members 45 and 46 respectively at the ends thereof for attachment to the axle or frame of the vehicle to be towed (see FIG. 3). The chains pass through hook members 48 and 49 which are attached to and extend from the sides of tray members 19 and 20 respectively and then run underneath bar members 40a and 40b of the bracket, which provide lift means, to the lift hook 50 of the tow truck lift mechanism 51 (see FIG. 1). Vertical bars 40c extend downwardly from bar 40a to form separator gates for guiding the chains which may both be in one or the other of the gates or may each be in one of the gates, depending on the tow. Support plate 15 is attached to bracket structure 61, which subtends from the back end of tow truck 60, by means of a ball and socket joint formed between the plate and ball member 62. Ball member 62 is secured to the bottom of bracket 61 by means of bolt 64. Bracket structure 61 is generally located directly to the rear of the tow truck differential so as to afford a good lever arm for the lifting action of lift mechanism 51. This is as compared with most prior art devices where the connection to the tow truck is made at the back plate of the truck body. Additional support for bracket 61 is provided by means of strut 66.

The ball and socket joint thus formed provides a limited amount of two degree motion (i.e., in "pitch" and "roll" but not "yaw" which is provided by the cradle arm pivots) between the plate 15 and bracket 61, and thus between the cradle arms and the tow vehicle. This movement is limited by the interference which occurs between plate 15 and the bracket. This provides sufficient play to facilitate the handling of the cradle arms by the operator and to avoid undue stress on the various members during towing.

Retainer forks 65 are utilized to retain the chains in position before the vehicle to be towed is hoisted to the desired position. Fork members 65 are then placed in bracket 40 over the chains as shown in FIG. 5, to arrest movement of the chains relative to the bracket. This prevents the placement of excessive force on the portions of the towed vehicle to which the chain is secured. Also, should the chain break forward of the bracket during towing, the tow will still be held in position. The retainer forks also tend to prevent any slack from appearing in the chains which could be caused by such factors as the wheel trays dragging on the ground, etc.

Figure 2:
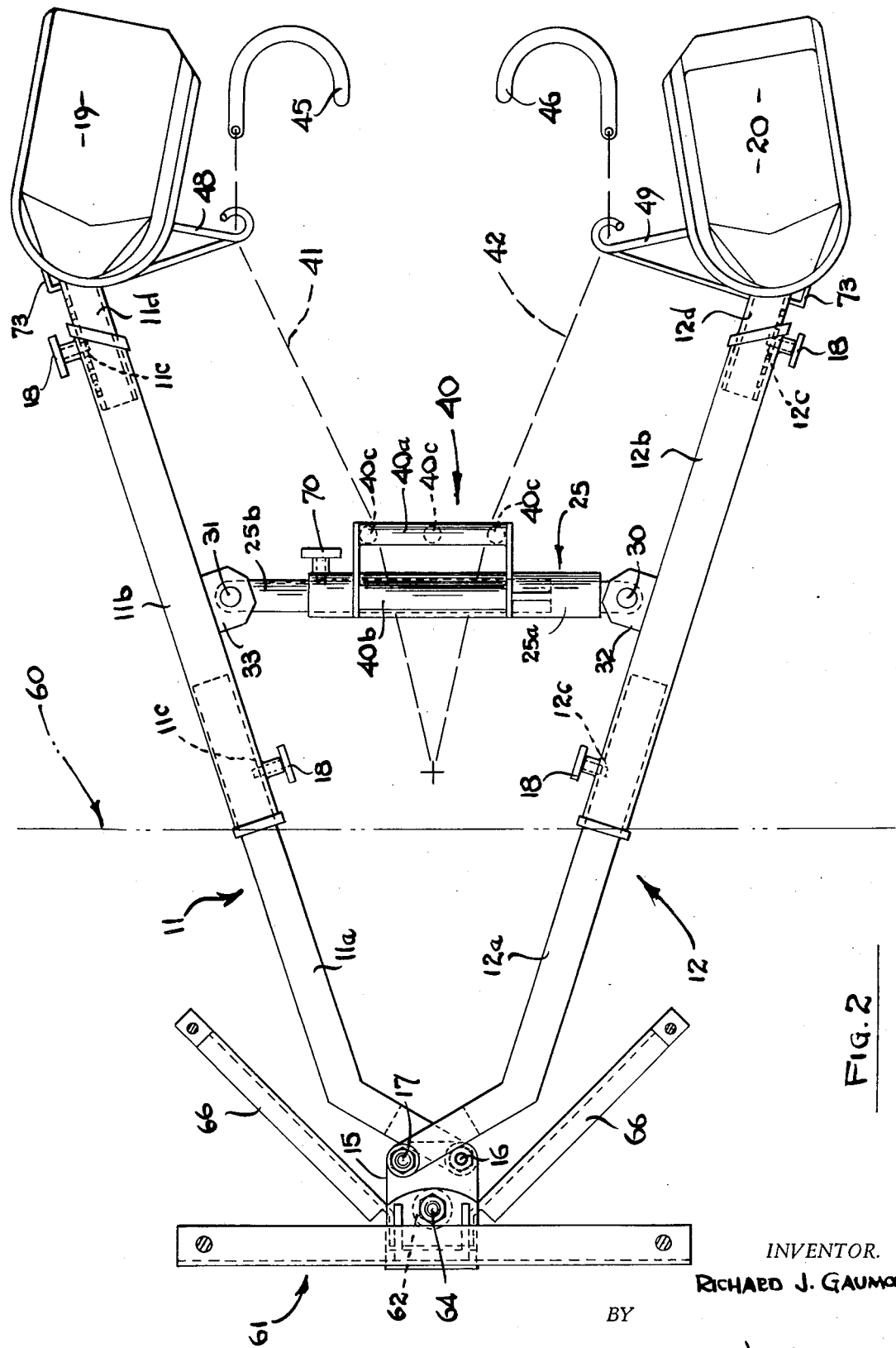
FIG. 2 is a top plan view of the preferred embodiment of the device of the invention.

Referring now to FIG. 1, the device of the invention is shown with a vehicle to be towed supported thereon. It is to be noted that in utilizing the device of the invention the cradle arms 11 and 12 are first placed in position with their wheel tray portions 19 and 20 on the ground, as shown in FIG. 3. The cradle arms are aligned opposite the front wheels of the vehicle to be towed in proximity thereto. The hooks 45 and 46 are then hooked onto the wheel axle as shown in FIG. 1, or to the frame of the vehicle, the two chains 41 and 42 being run through brackets 48 and 49 and bracket 40, as shown in FIG. 2, and attached to the hook 50 of lift mechanism 51, as shown in FIG. 1. The lift mechanism 51 is then operated to draw the front wheels of the vehicle onto trays 19 and 20. The holding forks 65 are then placed in position over the chains as already described. Further action of the lift mechanism 51 will then bring the vehicle 71 to the towing position shown in FIG. 1.

Wheel stops 72, which include plate portions 72a and arm portions 72b which are inserted in position in receptacles 73 provided immediately to the rear of trays 19 and 20, are used to arrest any possible motion of vehicle 71 towards the tow truck. This is preferably done before the wheel trays are lifted off the ground.

The device of this invention thus provides a simple, lightweight and highly adaptable cradle unit for use in towing vehicles. The device can readily be adjusted in the field to accommodate a great variety of sizes of vehicles, and can be handled rapidly and efficiently by a tow operator having only basic skills and experience.

While the device of the invention has been described and illustrated in detail, it is to be clearly understood that this is intended by way of illustration and example only and is not be be taken by way of limitation, the spirit and scope of this invention being limited only by the terms of the following claims.

I claim:

1. A device for connecting a vehicle to be towed to the lift mechanism of a tow truck comprising:
   a pair of cradle arms;
   support plate means for supporting said cradle arms at one end thereof for pivotal motion about a substantially vertical axis relative to the tow truck;
   means for attaching said support plate means to said tow truck for limited two degree freedom;
   wheel tray members for receiving the wheels of a vehicle to be towed attached to the ends of each of said cradle arms opposite to said one ends thereof;
   cross member means interconnecting said cradle arms at points therealong intermediate the ends thereof;
   means for adjusting the length of said interconnecting cross member means and thus the separation between said cradle arms;
   bracket means mounted on said cross-member means;
   pull means attached at one end thereof to said vehicle to be towed and extending through said bracket means;
   said bracket means having lift means under which said pull means runs;
   the other end of said pull means being attached to said lift mechanism;
   whereby when said lift mechanism is operated to provide lifting action on said lift means, said pull means draws a wheel of said vehicle onto each of said trays and then lifts said cradle arms upwardly to draw one end of said vehicle into a towing position.

2. The device of claim 1 and further including means for adjusting the longitudinal extent of each of said cradle arms.

3. The device of claim 1 wherein said pull means comprises a pair of chains, said chains each being attached to an opposite side of the front under-portion of said vehicle.

4. The device of claim 3 and further including retainer fork means placed over said chains where they pass through said bracket means to arrest movement thereof.

5. The device of claim 1 and further including wheel stop means removably retained in said cradle arms adjacent to said trays for arresting movement of said vehicle towards the tow truck.

6. The device of claim 5 wherein said wheel stop means comprises a plate member having an arm portion thereon, said cradle arms having receptacles therein for receiving said plate member arm portions.

7. The device of claim 1 wherein said means for attaching said support plate means to said tow truck comprises a ball and socket joint.

8. The device of claim 2 wherein said means for permitting longitudinal adjustment of said cradle arms comprises telescopic cradle arm sections and means for setting said cradle arms telescopically in any one of a number of relative positions.

9. The device of claim 1 wherein said means for adjusting the length of said cross member means comprises telescopically fitted sections and means for positioning said sections telescopically in any one of a number of predetermined relative positions.

10. The device of claim 1 wherein said cradle arms are attached to said support plate at opposite surfaces thereof and at oppositely positioned points, said arms crossing each other to arrive at these respective points.

11. The device of claim 9 wherein said cross-member means are pivotally connected to said cradle arms.

12. The device of claim 1 wherein said lift means comprises bar members extending across said bracket means.

13. The device of claim 1 wherein said bracket means is attached to said cross arm member.

14. The device of claim 1 wherein said support plate means is attached to said tow truck at a point directly to the rear of the differential thereof.

* * * * *